United States Patent [19]
Chen

[11] Patent Number: 5,943,877
[45] Date of Patent: Aug. 31, 1999

[54] SPACE VEHICLE FREEZER INCLUDING HEAT EXCHANGE UNIT SPACE USE

[75] Inventor: Jeffrey W. Chen, Irvine, Calif.

[73] Assignee: The Joseph Company, Laguna Niguel, Calif.

[21] Appl. No.: 08/868,189

[22] Filed: Jun. 3, 1997

Related U.S. Application Data

[63] Continuation-in-part of application No. 08/841,782, May 5, 1997.

[51] Int. Cl.$^6$ ....................................................... F25D 9/00
[52] U.S. Cl. .................................... 62/402; 165/4; 165/10
[58] Field of Search .......................... 62/402, 515; 165/4, 165/10

[56] References Cited

U.S. PATENT DOCUMENTS

| | | | |
|---|---|---|---|
| 4,665,973 | 5/1987 | Limberg et al. | 62/402 |
| 5,150,585 | 9/1992 | Markiewicz | 62/402 |

*Primary Examiner*—Ronald Capossela
*Attorney, Agent, or Firm*—Fulbright & Jaworski L.L.P.

[57] ABSTRACT

A gravity independent space vehicle freezer system which is adapted to provide optimal heat exchange to a medium to be cooled. The space vehicle freezer includes a heat exchange unit located in a housing or cold space, compressor, expander and electric motor. The expander allows the compressed refrigerant to expand at constant entropy instead of constant enthalpy, allowing the refrigerant gas to expand down to a very lower temperature. As a result, the compressed refrigerant can reject heat at a higher temperature prior to expanding to the necessary freezing temperature, thus reducing the size of radiators and providing critical weight and cost savings. The work produced by the expander is directed to the compressor to reduce the work load of the electric motor powering the compressor. The heat exchange unit includes a liner member routing the liquid refrigerant along the heat transfer surface, thereby isolating the evaporation process and overcoming the problem of separating liquid from gas in zero gravity. As a result of this process, the time required for the heat transfer process is decreased, thereby allowing for more effective cooling of the product.

12 Claims, 8 Drawing Sheets

SPACE VEHICLE FREEZER INCLUDING HEAT EXCHANGE UNIT SPACE USE

DESCRIPTION OF RELATED APPLICATION

This is a continuation-in-part of U.S. application Ser. No. 08/841,782, filed on May 5, 1997.

BACKGROUND OF THE INVENTION

1. Field of the Invention

The present invention relates generally to heat exchange units for cooling a product, and more particularly to freezers including heat exchange units which are adapted to be utilized in gravity and orientation independent circumstances, particularly such as in space installations.

2. Description of the Prior Art

Spacecraft and space technology has advanced to the point where lengthy missions are feasible and permanent in-orbit stations are being developed for deployment in space. With the time astronauts spend in space extending to longer periods, there is a greater desire to provide foods other than the typical space meals which are typically maintained at medium temperatures. For example, there is a desire to provide frozen or cold food, such as ice cream, soft drinks or other products, for consumption. In the zero-gravity or near vacuum environment of space, it is desirable to accomplish such in-orbit refrigeration of goods with minimal power consumption and in as compact a manner as possible. This is particularly important in the consideration of long term space voyages and permanent stations, in which the difficulties of transporting frozen or refrigerated food to the inhabitants will be extremely high.

Conventional heat exchange units are generally ineffective in the zero-gravity or near vacuum environment of space. This is because known heat exchange units which perform well at normal atmospheric pressure use pressurized refrigerants which, in space applications, may leak into a confined space and have potential to explode. Additionally, in a zero-gravity environment, there is a problem with separating liquid from gas. In particular, conventional refrigerators and freezers do not work in zero gravity because they rely on gravity to separate the liquid refrigerant from gas.

In space, the only mechanism for rejecting heat is by radiation. The equation for the rate of heat rejection per unit area (heat flux) is:

$$q' = \epsilon\sigma(T_s^4 - T_{surr}^4) \quad (1)$$

where $\epsilon\sigma$=emissivity properties of the heat exchanger materials.

$T_s$=heat exchanger surface temperature, i.e., temperature heat is rejected at.

$T_{surr}$=temperature of the surroundings that the heat is being rejected into.

Generally, space vehicles require minimum weight, size, vibration, noise, maintenance and power consumption for its freezer system which will store frozen food for the crew. Although the surrounding temperature is very cold in space, there is no air or other matter to transfer rejected heat into. Consequently, rejecting heat by radiation is a slow process that requires huge surface areas, such as surface areas in the range of 6000 square feet for the space station, to dissipate excess heat. Enormous heat exchange surfaces thus must be attached to a space vehicle to reject the excess heat into space.

What is needed therefore is a gravity and orientation independent space vehicle freezer including a heat exchange device which is safe, energy efficient, space efficient and lightweight.

SUMMARY OF THE INVENTION

The preceding and other shortcomings of prior art products are addressed and overcome by the present invention which provides a gravity independent space vehicle freezer system which is adapted to provide optimal heat exchange to a medium to be cooled. The freezing system for use with a radiating device includes a housing, a heat exchange unit disposed within the housing which is adapted to provide optimal heat exchange to a medium to be cooled, a compressor for compressing the gas to an elevated temperature and pressure, means for applying the compressed gas to the radiating device for cooling the compressed gas, an expander for expanding the cooled compressed gas at constant entropy, and means for applying the expanded gas to the housing.

The heat exchange unit includes a liner member routing the liquid refrigerant along the heat transfer surface, thereby isolating the evaporation process and overcoming the problem of separating liquid from gas in zero gravity. As a result of this process, the time required for the heat transfer process is decreased, thereby allowing for more effective cooling of the product. The liner member is disposed concentric with the heat exchange unit wall and surrounds the inner surface of the heat exchange unit wall to facilitate the flow of refrigerant throughout the heat exchange unit. Liner caps are disposed at each end of the heat exchange unit for preventing the refrigerant from leaving the liner area.

In another aspect of the invention, the present invention utilizes rotational motion of a paddle about a central axis for circulating a refrigerant medium to the walls of a vacuum vessel for facilitating heat exchange.

Under zero gravity conditions, the preferred refrigerant in the heat exchange unit is propylene glycol ($CH_2OHCHOHH_3$), mixed at a ratio of approximately 10–20% by weight with water.

The foregoing and additional features and advantages of this invention will become apparent from the detailed description and accompanying drawing figures that follow. In the figures and the written description, numerals indicate the various features of the invention, like numerals referring to like features throughout for both the drawing figures and the written description.

DETAILED DESCRIPTION OF THE PREFERRED EMBODIMENTS

Figure 1:
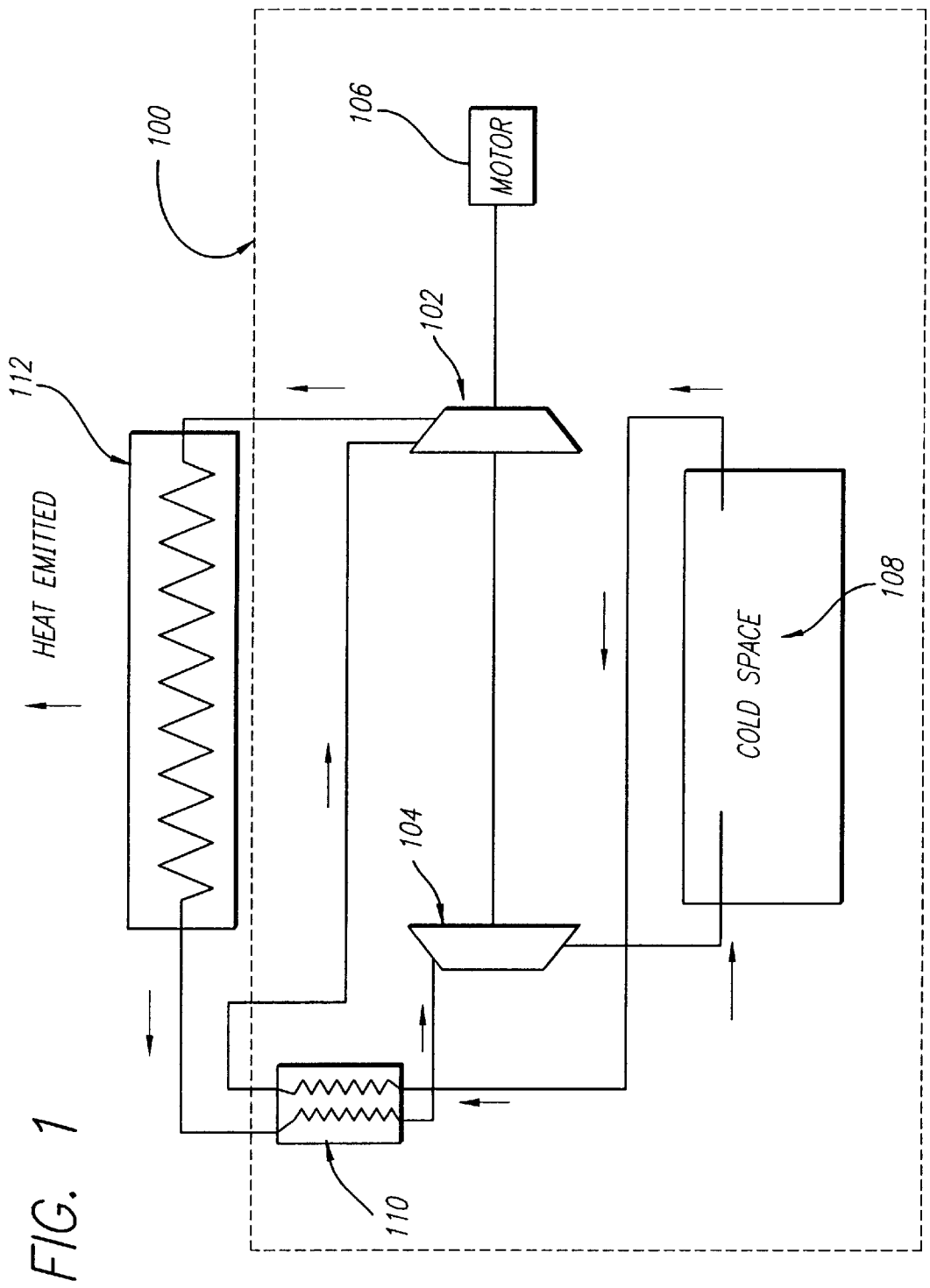
FIG. 1 is a block diagram of a space vehicle freezing system in accordance with a preferred embodiment of the present invention.

Referring to FIG. 1, there is shown generally a space vehicle freezing system 100 including a heat exchange unit 10 located within in a housing or cold space 108, compressor 102, expander 104, and motor 106 for cooling a product, such as ice cream, soft drinks, and the like, constructed in accordance with the principles of the present invention. The present invention is a gravity independent space vehicle freezing system 100 which is adapted to provide optimal heat exchange to a medium to be cooled disposed within the cold space 108. As is explained in detail below, in the preferred embodiment of the present invention, the heat exchange unit 10 utilizes a liner member 42 for circulating a refrigerant medium (not shown) to the walls 16 of a vacuum vessel 18 for facilitating heat exchange. The preferred application of the present invention is in spacecraft where the heat exchange unit 10 functions in a zero-gravity environment. Thus, for illustrative purposes, the present invention is described herein for cooling food for space use, i.e. in a zero gravity environment. One skilled in the art will recognize, however, that with minor modifications, this invention can be adapted to operate in a partial or full gravity environment for cooling. Moreover, the present invention is not limited to providing self-cooling for food or beverage products. Rather, the present invention may be used to provide self-cooling for a variety of different applications, including but not limited to cooling food, beverage, chemical and industrial containers of various sizes and shapes, as well as refrigeration systems.

An advantage of the present invention is that the exit temperature that heat is rejected at by the radiators 112 on the space vehicle is raised, therefore allowing the size of the radiators 112 to be reduced significantly, providing critical weight and cost savings in space vehicle construction.

Another advantage of the present invention is that it may be utilized under environmentally adverse conditions.

A further advantage of the present invention is that a refrigerant which boils at very low pressures may be utilized.

Another advantage of the present invention is that it is space efficient and compact and may be constructed to conform to limited space requirements, such as in space vehicles or installations.

Still another advantage of the present invention is that it may be made independent of orientation, with the systems being adapted to work in any gravitational orientation, including weightlessness.

A further advantage of the invention is that it is unobtrusive, in that it may operate in a quiet manner and without an obvious impact on the surrounding environment.

Figure 2:
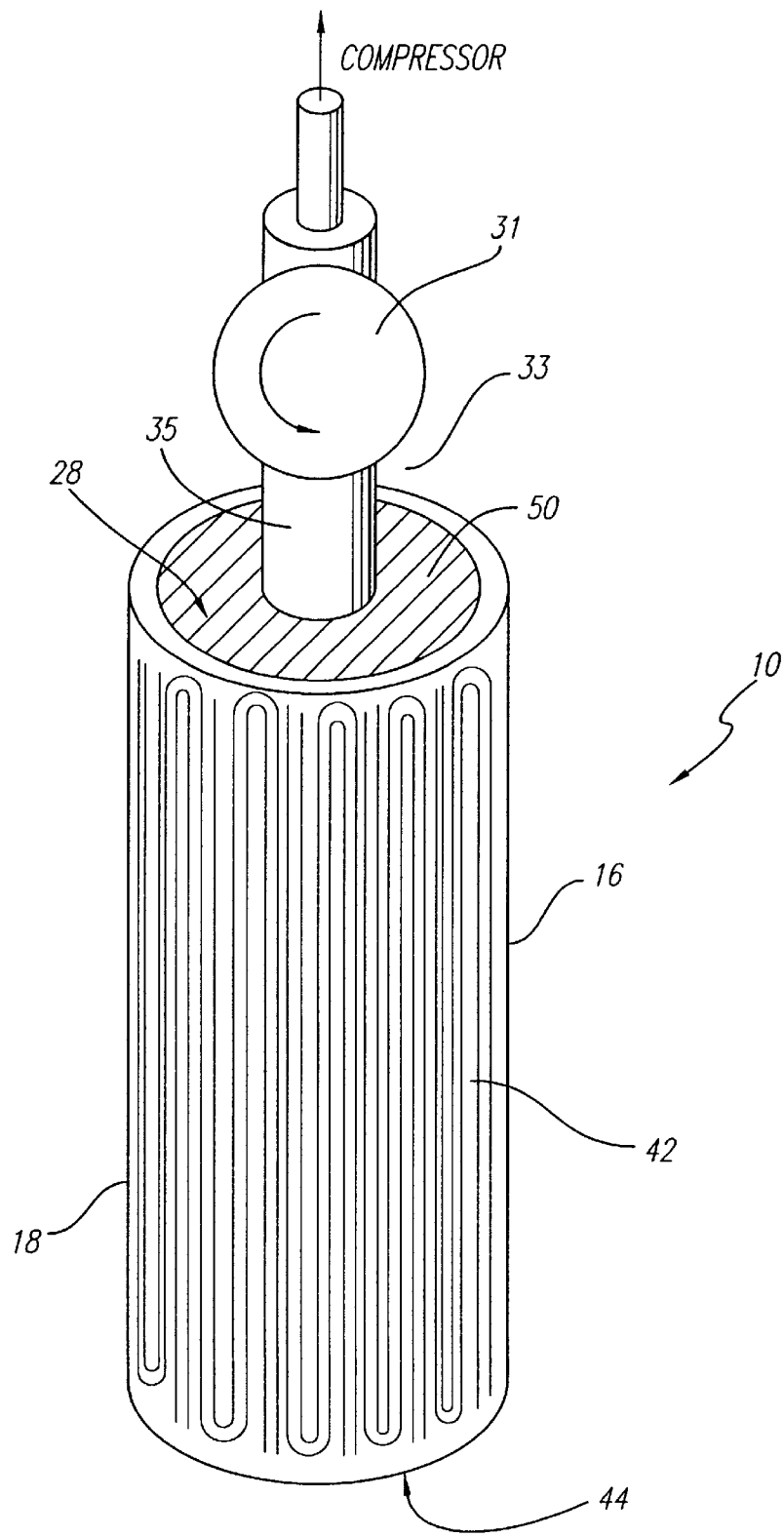
FIG. 2 is a perspective view of the heat exchange unit including liner member of FIG. 1.

As is shown in FIGS. 1 and 2, the space vehicle freezing system 100 is generally comprised of the HEU 10 located within in the housing for the cold space 108, compressor 102, expander 104 and motor 106. Under zero gravity conditions, the preferred refrigerant in the heat exchange unit 10 is propylene glycol ($CH_2OHCHOHH_3$), mixed at a ratio of approximately 10–20% by weight with water. One skilled in the art will recognize that a variety of other refrigerants may be used under zero gravity conditions as well, including, but not limited to, salt mixed at a ratio of approximately 25% by weight with water, ethanol mixed at a ratio of approximately 40% by weight with water, and the like.

Under gravity conditions, the preferred refrigerant in the vessel 18 is HFC 134A (tetrafluoroethane), typically stored at a pressure of 85 p.s.i.a. at 75 degrees F. Alternatively, HFC 152A (difluoroethane) typically stored at a pressure of 85 p.s.i.a. at 75 degrees F may be used. As another alternative, a mixture which may be used to cool the beverage is a mixture of butane and HFC 134A (tetrafluoroethane) in a ratio of 60:40 (butane:HFC 134A) may be used. As still another alternative, the heat exchange unit may contain a compressed gas such as air, carbon dioxide, an air/$CO_2$ mixture or the like. One skilled in the art will appreciate that the mixture of the gases will vary depending on various factors, including but not limited to the degree of cooling that is desired, the nature of the gas, the pressure, and the size and shape of the vessel 18. One skilled in the art will recognize that the present invention is not limited to use with a particular type of refrigerant or gas. Rather, the required refrigerant will be that which is most ideally suited for the particular environmental.

The expander 104 allows the compressed refrigerant to expand at constant entropy instead of constant enthalpy, allowing the refrigerant gas to expand down to a much lower temperature than would be possible across a conventional Joule-Thompson throttling valve. As a result, the compressed refrigerant can reject heat at a higher temperature prior to expanding to the necessary freezing temperature, thus reducing the size of radiators and providing critical weight and cost savings. The work produced by the expander 104 is directed to the compressor 102 to reduce the work load of the motor 106 powering the compressor 102.

Referring to FIGS. 1 and 2, the zero gravity liner member 42 (FIG. 2) is disposed in the heat exchange unit 10 for absorbing heat in the housing or cold space 108 in a zero gravity environment independent of orientation. The heat being removed is absorbed into the housing 108, which may be an insulated enclosed housing such as a freezer. The housing 108 may be realized for example, as an annular cylinder with a hollow tubular center that is blocked off at both ends to establish an internal storage area. One skilled in the art will recognize that the housing 108 is not limited to a particular shape, but may rather be designed to accommodate any particular shape desired.

The housing 108 is connected to a regenerator heat exchanger 110 via a pipe, such as a conduit. The expanded gas from the heat exchange unit 10 in the housing 108 leaves the housing 108, flows through the pipe and enters the regenerator heat exchanger 110 which pre-cools the gas, thus maximizing the temperature coming out of the radiator 112. One skilled in the art will recognize that the regenerator heat exchanger 110 is optional and is preferably used in a freezing application, when the cold air coming out of the housing 108 is not at or near freezing temperature. The regenerator heat exchanger 110 may be a conventionally implemented heat exchanger. In cases where the regenerator heat exchanger 110 is not desired, the expanded gas from the housing 108 is applied directly via a pipe to the compressor 102.

The expanded gas is then applied to the compressor 102, which compresses the expanded gas mechanically, raising the gas to an elevated temperature and pressure. The compressor 102 is run by a motor 106, preferably an electric motor, which is disposed on the same shaft as the expander 104 and compressor 102 and provides an auxiliary torque. The shaft is preferably supported by magnetic bearings and for the purposes of use in space, minimizes the maintenance and vibration and increases the longevity of the system.

The expanded gas is then applied to radiators 112 located on the space vehicle which through heat exchange, radiate heat into space. One skilled in the art will recognize that the radiator 112 may be any radiating apparatus which is conventionally implemented on a space vehicle to radiate heat since there is no air or other medium to transfer heat into outer space. The only mechanism thus for dissipating or rejecting any kind of waste is by radiation via the radiator 112. The radiator 112 is typically comprised of a very large surface with honeycomb material on it to increase the surface area which is exposed to radiation.

After the radiator 112 has cooled the fluid to a certain extent, the pressurized cooled liquid, a gas in most cases, is applied via a pipe, such as a conduit, to the expander 104. The expander 104 allows the compressed refrigerant to expand at constant entropy rather than constant enthalpy as occurs in conventional refrigerators across a throttling valve. In accordance with the present invention, the refrigerant is allowed to expand down to a much lower temperature than would be possible across a conventional Joule-Thompson throttling valve. As a result, the compressed refrigerant can reject heat at a higher temperature prior to expanding to the necessary freezing temperature, achieving the weight and cost savings discussed above. The work produced by the expander 104 is directed to the compressor 102 to reduce the work load of the motor 106 powering the compressor 102. The compressor 102 is thus partially driven by the expander 104. The expanded gas from the expander 104 is then introduced into the housing 108 via a pipe, such as a conduit.

The pressurized cooled liquid from the radiator 112, prior to being applied to the expander 104, may be applied via a pipe, such as a conduit, to the regenerator heat exchanger 110 which further pre-cools the gas, thus maximizing the temperature coming out of the radiator 112. As previously noted, one skilled in the art will recognize that the regenerator heat exchanger 110 is optional and is preferably used in a freezing application, when the cold air coming out of the housing 108 is not at or near freezing temperature. In cases where the regenerator heat exchanger 110 is not desired, the pressurized cooled liquid from the radiator 112 is applied directly via a pipe to the expander 104.

The present invention is preferably implemented as one moving assembly which spins without vibration and can be supported by magnetic bearings which will minimize noise and maintenance requirements. In operation, the expander 104, compressor 102 and motor 106 are all on one shaft. The expander 104 is thus actually providing work. As the gas expands through the expander 104, it undergoes an isotropic process—ideally a constant entropy process, where while it is undergoing work, it loses enthalpy, changes enthalpy and drops in temperature to a level which provides the needed cooling in the housing 108.

Thus, in accordance with an advantage of the present invention, the exit temperature that heat is rejected at by the radiator 112 is raised, therefore allowing the size of radiators 112 to be reduced significantly, providing critical weight and cost savings in space vehicle construction.

As is shown in FIG. 2, the heat exchange unit 10 located within the housing 108 is generally comprised of a vessel 18, liner member 42, and a valve 33 including actuator 31. For purposes of description, the heat exchange unit 10 may be considered to be substantially radially symmetrical about a primary axis with one portion of the system designated for convenience as the top 28 (FIG. 4) and the opposing portion being designated for convenience as the bottom 44. It is understood that these designations are arbitrary since the heat exchange unit 10 is adapted to be utilized in any orientation. However, the directional designations are supplied for the purposes of ease of description, and will be typical orientations for the usage of the system under gravity.

The heat exchange unit 10 absorbs heat from the product 12 to be cooled (shown illustratively in FIG. 3) through the wall 16 which is preferably manufactured from a heat conducting material such as steel. Alternatively, the heat exchange unit wall 16 may be manufactured from an aluminum or plastic material, such as polycarbonate, polyethylene and polyester and the like.

Referring to FIG. 2, the contents of the vessel 18 are exposed to a vacuum induced in the vessel 18. The liner member 42 circulates the heat exchange medium or refrigerant to the wall 16 of the vacuum vessel 18 therefore facilitating heat exchange between the heat exchange unit 10 and the medium 12 to be cooled. In particular, the cooled refrigerant absorbs the heat of the medium 12 to be cooled, thereby warming the refrigerant and cooling the medium through heat exchange.

As is therein shown in FIG. 2, the heat exchange unit 10 includes a vessel 18 which interfaces with a valve 33. The valve 33 may be any commercially available valve such as a valve designed for a pipe fitting. The bottom portion 44 of the vessel 18 is integrally formed with the wall 16 of the vessel 18 and is preferably manufactured from aluminum, although other materials, including but not limited to steel, may be used as well. As is illustrated in FIG. 2, the valve 33 including an actuator 31 which interacts with the heat exchange unit 10. Through a connection 35, such as a conduit, pipe or other type of connection, gas in the vessel 18 is ejected through the valve 33 to the compressor 102 (FIG. 1).

As is shown in FIG. 2 and hereinafter more fully described, the heat exchange unit 10 preferably includes a liner member 42 for increasing the effective heat transfer surface, thereby isolating the evaporation process and overcoming the problem of separating liquid from gas in zero gravity. The liner 42 operates to distribute the refrigerant about the heat exchange unit wall 16. As a result of this process, the time required for the heat transfer process is decreased, thereby allowing for more effective cooling of the product. The liner member 42 is disposed concentric with the heat exchange unit wall 16 and surrounds the inner surface of the heat exchange unit wall 16 to facilitate the flow of refrigerant throughout the heat exchange unit 10. The liner member 42 is preferably manufactured from a material, such as polypropylene, which can be wetted by the liquid refrigerant to increase the flow of refrigerant between the liner member 42 and the wall 16 of the heat exchange unit 10. Other plastics, including, but not limited to, polyester (PET) and the like may be used as well.

Figure 3:
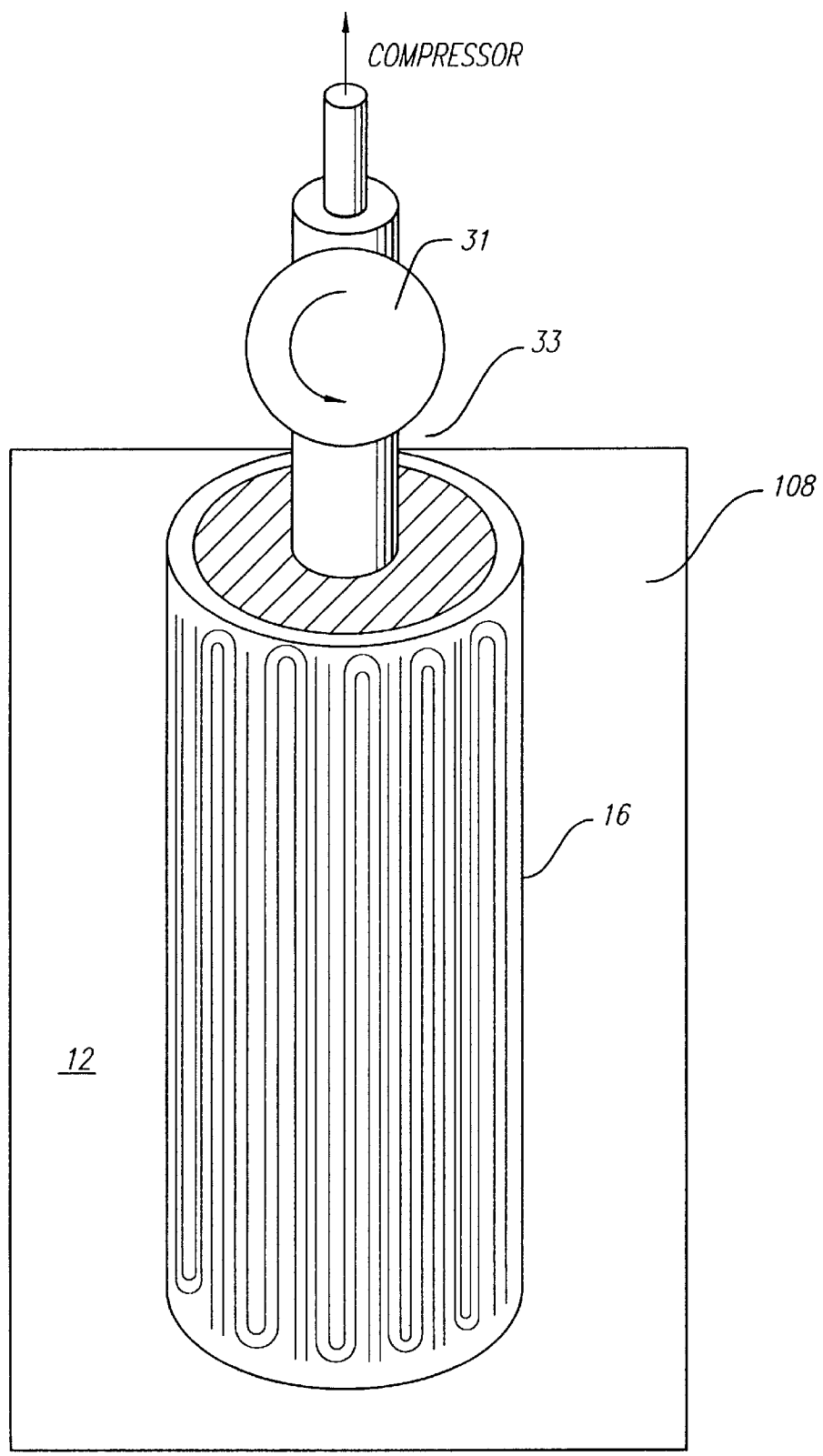
FIG. 3 is a perspective view of the heat exchange unit illustrated in FIG. 2 in use with a medium to be cooled.
Figure 4:
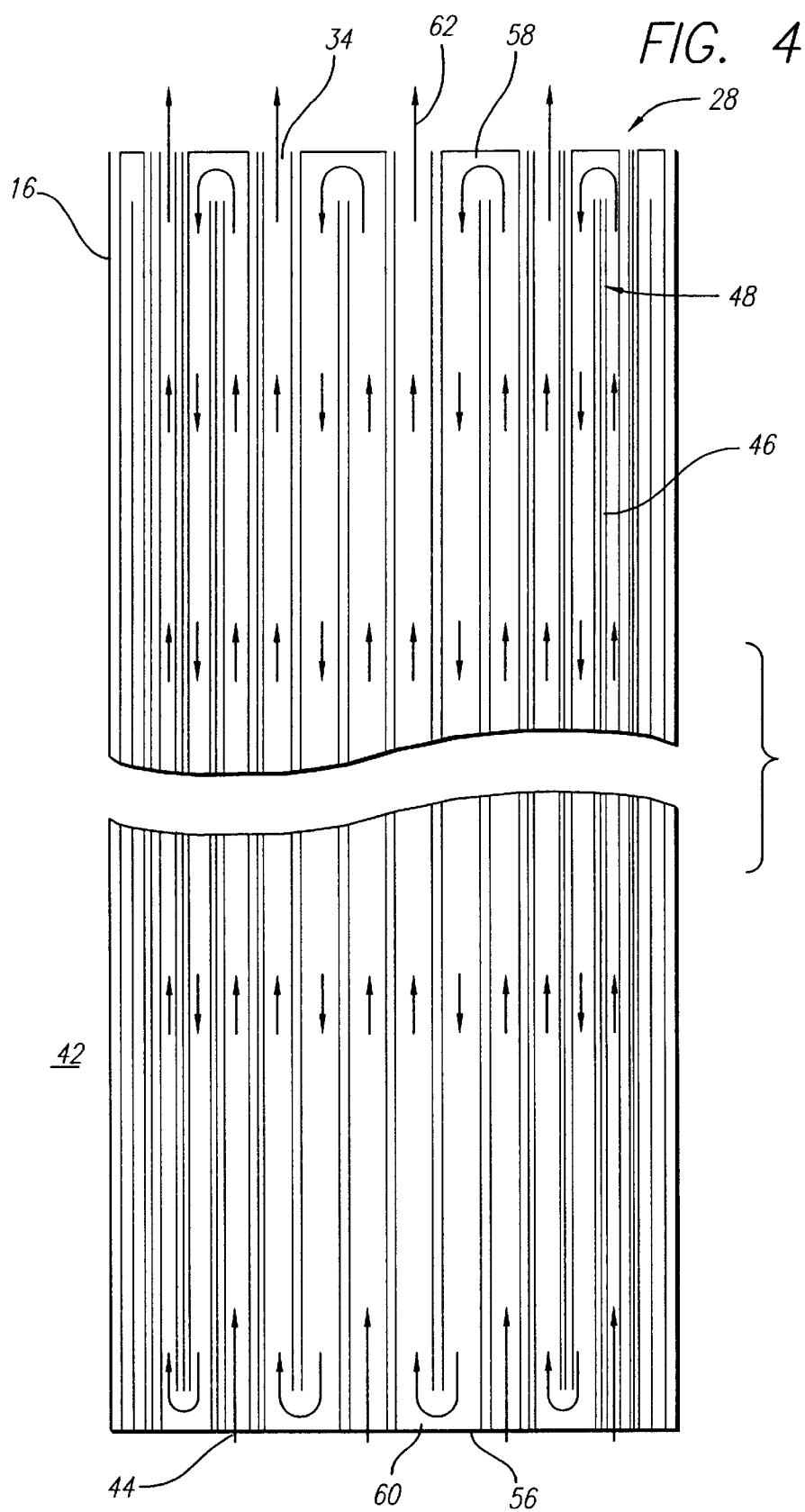
FIG. 4 is a side view of the liner member as illustrated in FIG. 2.

Referring to FIGS. 2–4, the liner member 42 includes a plurality of ribs 46 spaced along the outer surface of the liner member 42 to form a plurality of channels 48 along the inner surface of the heat exchange unit wall 16. The channels 48 extend substantially from adjacent the base 44 to the top end 28 of the vessel 18. Disposed at the top 28 of the liner member 42 is a liner cap 50 for minimizing the escape of refrigerant from the heat exchange unit 10. One skilled in the art will recognize that a liner cap 50 may similarly be positioned at the bottom of the liner member 42 for the same reason.

As shown in FIG. 4, the ribs 46 are disposed substantially vertically, that is, substantially perpendicular to the base 44 of the vessel 18. The ribs 46 are preferably disposed longitudinally in a formation to form a series of channels 48 which are "S-shaped" along the length of the wall 16 of the heat exchange unit. In particular, a typical "S-shaped" formation includes a channel 48 which has an opening 56 on the bottom 44, extends upward to the top 28 then turns downward 58 and then upward 60 again before releasing 62 the refrigerant. The liner member 42 includes a plurality of "S-shaped" channels disposed adjacent to one another. An advantage of this configuration is that a longer path for evaporation is provided.

Figure 5:
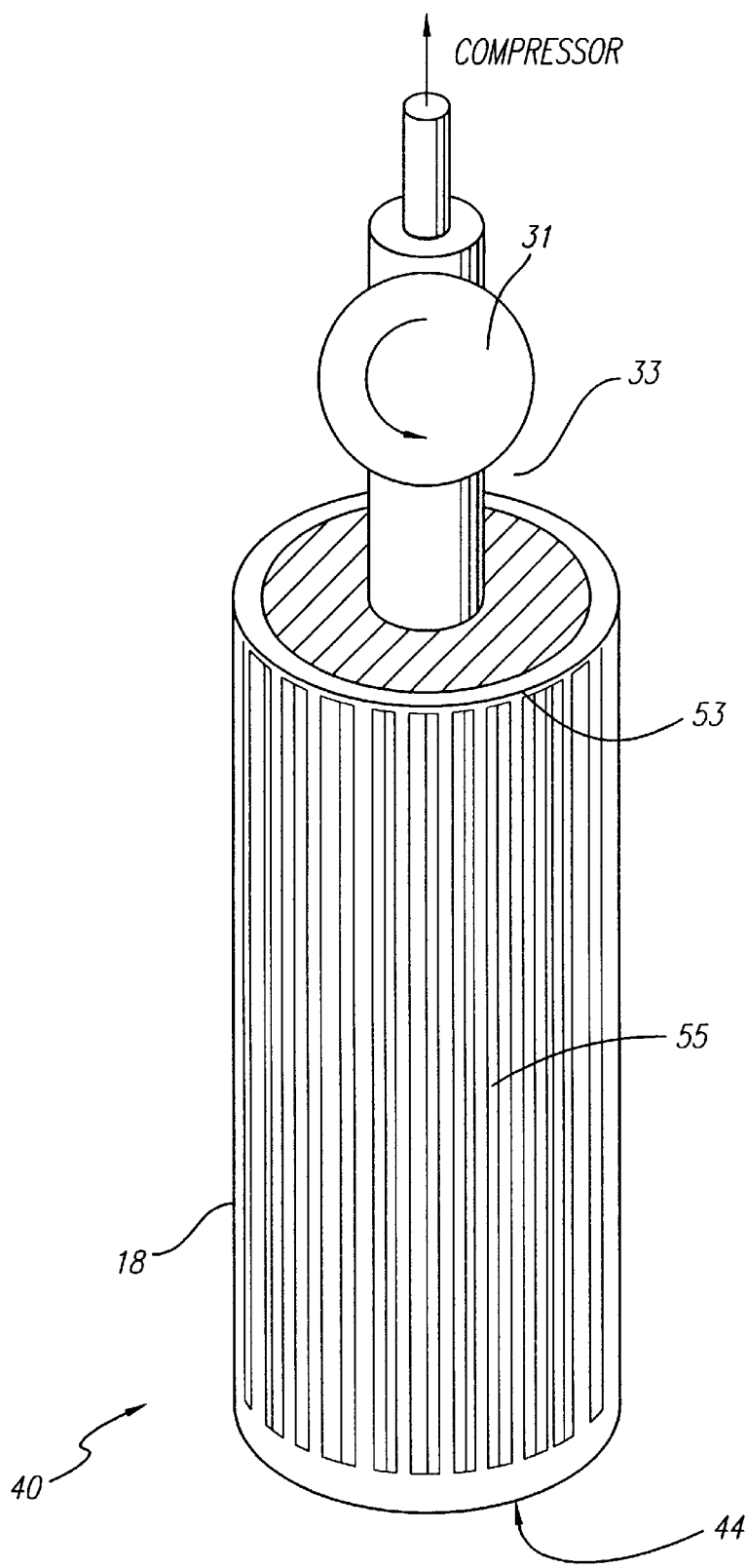
FIG. 5 is a perspective view of a heat exchange unit including liner member in accordance with another embodiment of the present invention.
Figure 6:
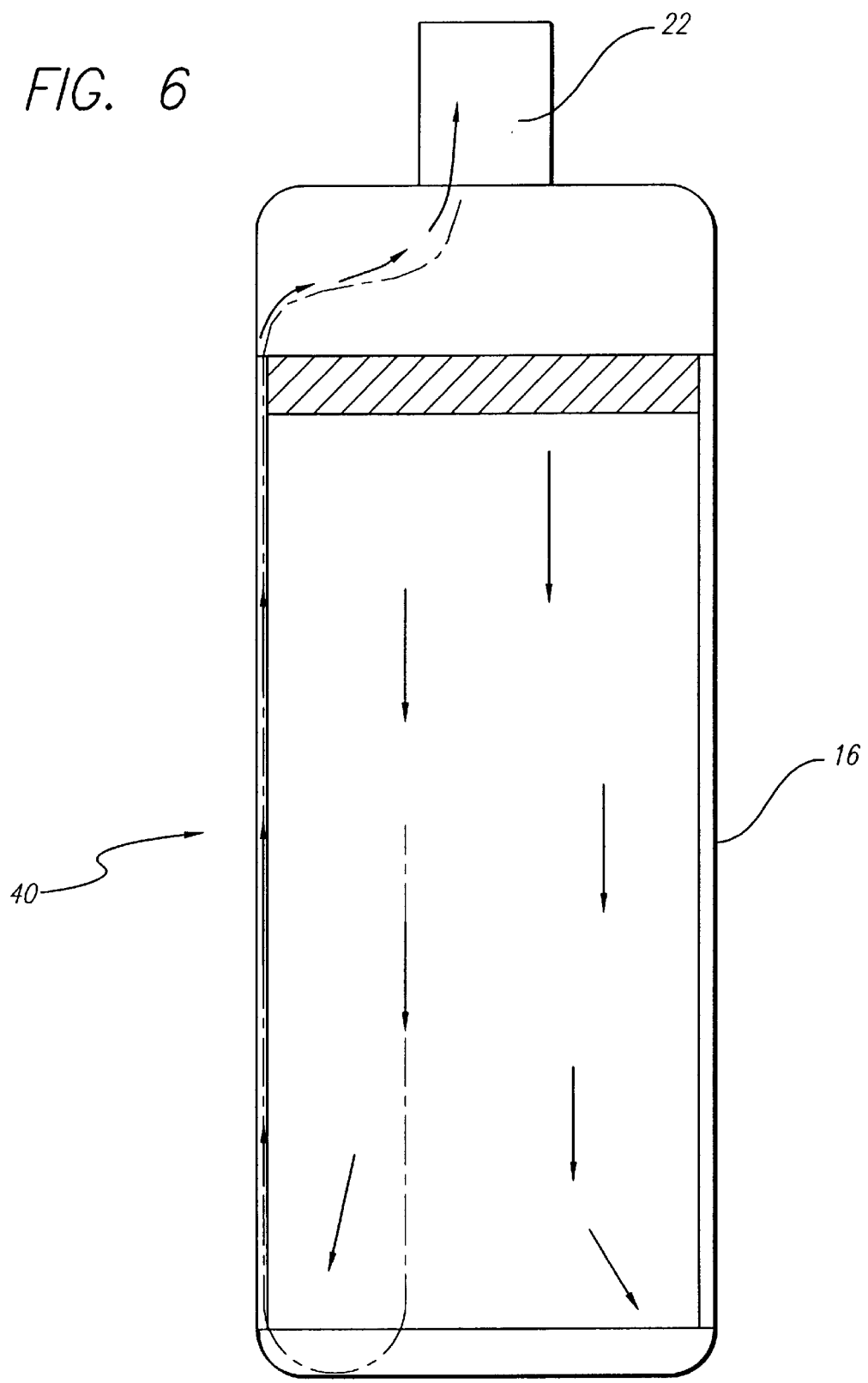
FIG. 6 is an illustration of the flow path of refrigerant through liner member of the heat exchange unit illustrated in FIG. 5.

It will be understood by those skilled in the art that the ribs 46 may be disposed in other alternative configurations to provide for effective cooling of the beverage. For example, referring to FIG. 5, the ribs 53 are disposed longitudinally in a formation to form a series of channels 55 which allow the liquid refrigerant to enter the bottom 44 of the channel 55 and propogate to the top 28 of the channel to be released. In contrast to FIG. 4, the channels 55 are not disposed in a "S-shaped" formation, rather they allow the liquid refrigerant to move to escape from the top 28 of the heat exchange unit 40 in a more direct straight line path as illustrated in FIG. 6.

Typically, each rib extends from the liner member approximately 0.02 inch (0.51 mm) and is approximately 0.02 inch (0.51 mm) in width, and the liner member is approximately 2.23 inches (56.6 mm) in height and has a length sufficient to engage the entire inside surface of the heat exchange unit wall 16. Referring to FIG. 4, to form the "S-shaped" channels, some of the ribs 46 are shorter. The ribs are preferably spaced approximately 10 degrees apart, thus creating a liner member containing approximately 36 ribs. Those skilled in the art will readily recognize that the dimensions of the ribs and channels will vary depending on factors, including but not limited to the dimensions of the heat exchange unit 10 in which the liner member is used and the dimensions of the container the heat exchange unit 10 is designed to cool.

In operation, the heat exchange unit 10 is activated via activating the valve 33 via the actuator 31. Once the heat exchange unit 10 has been activated, the vessel 18 is exposed to vacuum. The initial heat transfer between the product 12 to be cooled and the liquified refrigerant occurs within the plurality of channels 48. Heat from the beverage is absorbed by the liquified refrigerant through the wall 16 of the chamber as the liquified refrigerant vaporizes due to thermal boiling.

Normally, when the vessel 18 containing a liquified refrigerant is allowed to vent to vacuum, liquified refrigerant will evaporate. During and after the time it self cools to a new temperature corresponding to its new vapor pressure, it absorbs heat from its surroundings. This heat causes the liquified refrigerant to evaporate. Self cooling also generates some gas. After self cooling takes place, all the gas that is generated is a result of heat being transferred through the skin of the vessel 18 from its surroundings. The rate at which heat transfers into the vessel 18 determines the rate at which gas is generated. Since vapor has such a poor coefficient of heat transfer, the only surface which has effective heat transfer is the portion of the surface which is in contact with the liquified refrigerant. Where the pressurized vessel 18 is inside a container, such as a beverage container or a canteen holding a beverage, there is a portion of the surface on the side of the vessel 18 in contact with the beverage where little heat transfer is taking place because evaporated gas is immediately on the other side of the skin of the vessel 18.

In accordance with an advantage of the present invention, by incorporating the liner member 42 into the vessel 18, essentially the entire surface area on the sides can be kept to transferring heat until nearly all the liquified refrigerant has been evaporated. Since evaporation can only occur where the required heat is available, evaporation on the sides will only occur in the vertical channels 48. The gas that is generated forms bubbles which travel up the channels 48 to the top end 28. When they burst, the gas collects in the top of the vessel 18 and eventually exits out one of the gas outlet apertures 34. As the gas bubbles travel upward, they carry liquified refrigerant with them, thus keeping the entire side wall 16 bathed with liquified refrigerant regardless of the liquified refrigerant level in the vessel 18. The entire side of the wall 16 remains effective throughout the heat transfer process. As the liquified refrigerant evaporates, it is replaced by liquified refrigerant flowing into the bottom 44 of the channels 48. The net result is a routing of the liquid refrigerant along the heat transfer surface thereby isolating the evaporation process and overcoming the problem of separating liquid from gas in zero gravity.

Figures 7, 8:
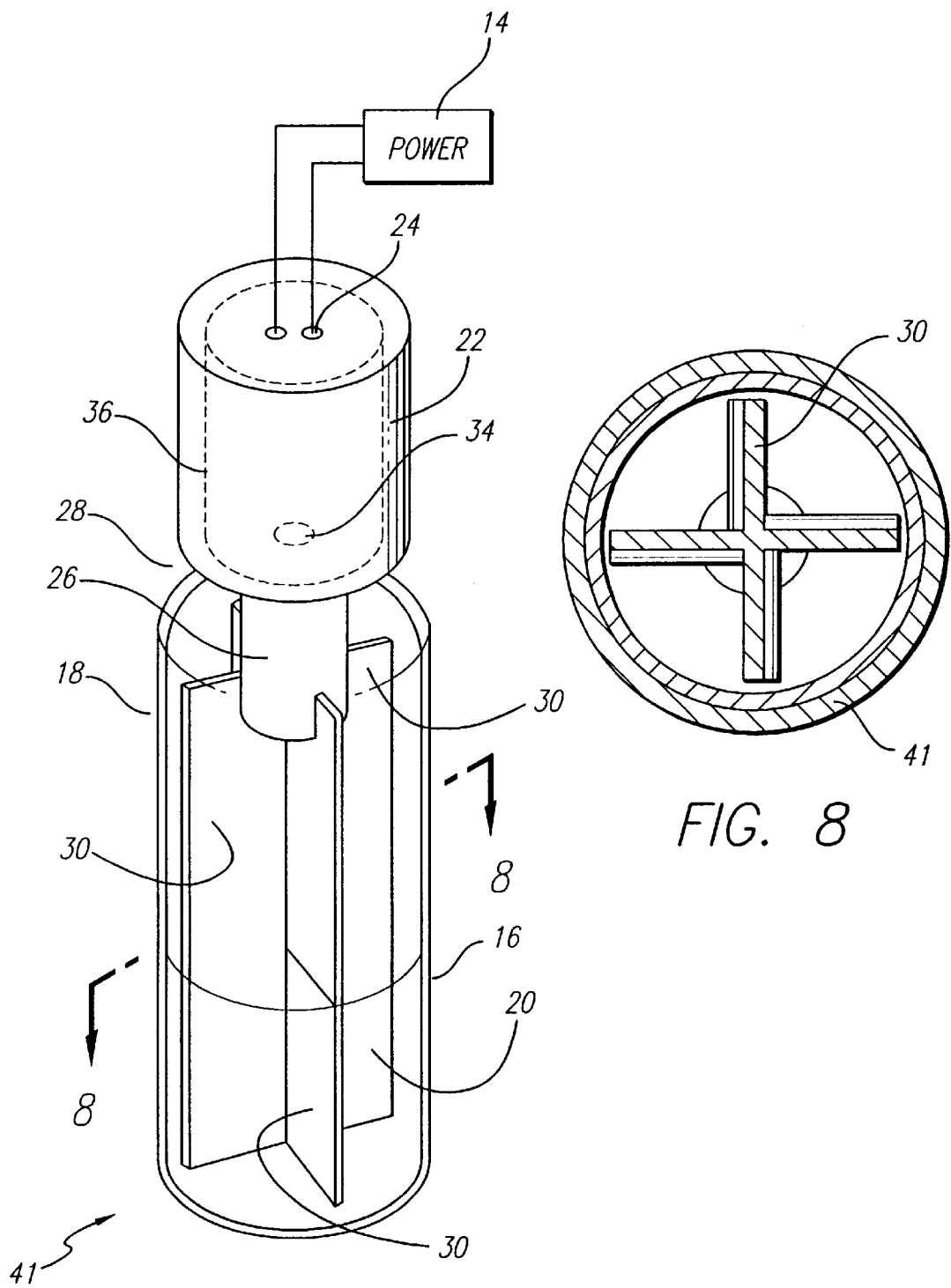
FIG. 7 is a perspective view of a heat exchange unit including paddle wheel in accordance with another embodiment of the present invention.
FIG. 8 is a cross-sectional top view of the heat exchange unit illustrated in FIG. 2.

As is illustrated in FIG. 7, in an alternative embodiment of the present invention, a gravity independent heat exchange unit 41 utilizes the rotational motion of a paddle assembly 20 about a central axis for circulating a refrigerant medium 12 to the walls 16 of a vacuum vessel 18 for facilitating heat exchange. The heat exchange unit 41 is generally comprised of a vessel 18, heat exchange unit cap 22, a plurality of gas outlets 24, a rotating paddle assembly 20 which is rotated by a paddle drive assembly, and interface 24 to a power source 14. For purposes of description, the heat exchange unit 41 may be considered to be substantially radially symmetrical about a primary axis with one portion of the system designated for convenience as the top and the opposing portion being designated for convenience as the bottom. It is understood that these designations are arbitrary since the heat exchange unit 41 is adapted to be utilized in any orientation. However, the directional designations are supplied for the purposes of ease of description, and will be typical orientations for the usage of the system under gravity.

Figure 9:
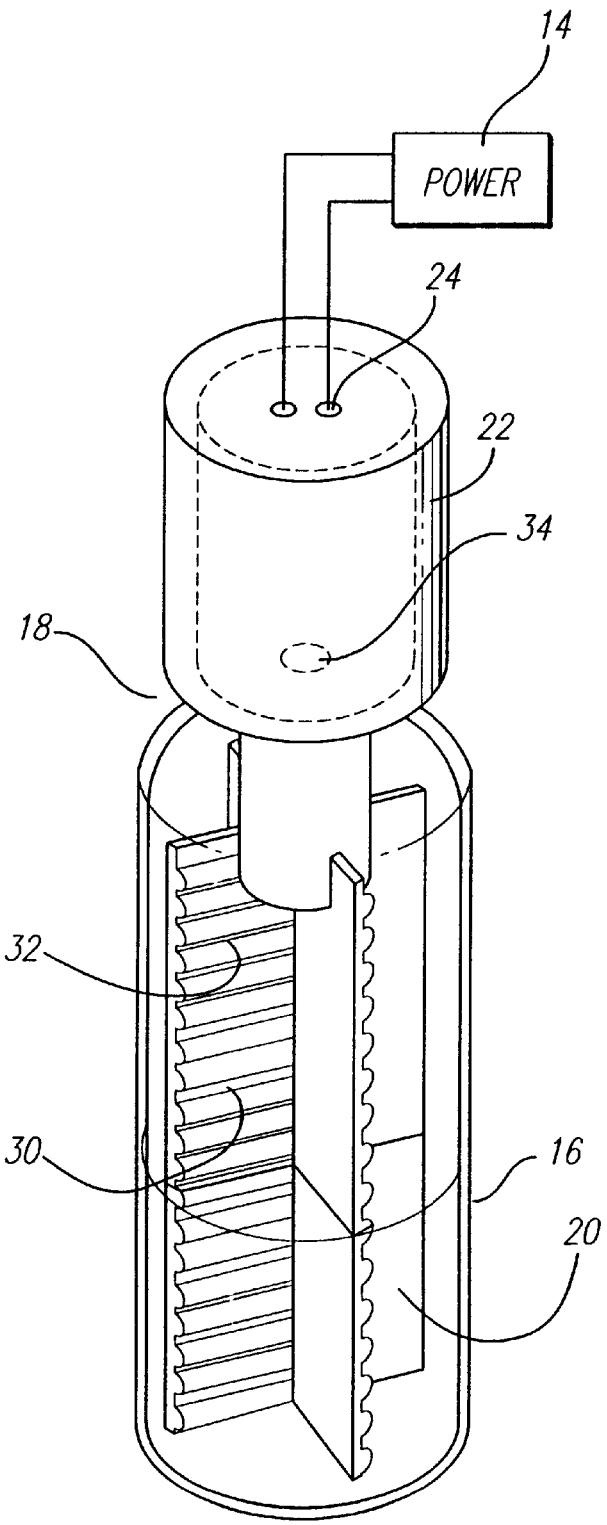
FIG. 9 is a perspective view of a heat exchange unit including paddle wheel with longitudinal ridges in accordance with the present invention.

Referring to FIG. 7, the contents of the vessel 18 are exposed to a vacuum induced in the vessel 18. The rotating paddle assembly 20 circulates the heat exchange medium or refrigerant to the wall 16 of the vacuum vessel 18 therefore facilitating heat exchange between the heat exchange unit 41 and the medium 12 to be cooled. In particular, the cooled refrigerant absorbs the heat of the medium 12 to be cooled, thereby warming the refrigerant and cooling the medium through heat exchange. The rotating paddle assembly 20 includes a shaft 26 which extends longitudinally about the primary axis in the top portion 28 of the heat exchange unit 41. Referring to FIG. 8, the rotating paddle assembly 20 includes paddle portions 30 which are spaced equidistantly from each other and extend longitudinally from the shaft 26 and radially outward from the central axis such that the paddle portions 30 are in close proximity, but not touching the side wall 16 of the vessel 18. In the preferred embodiment, illustrated in FIG. 7, four paddle portions 30 are equally radially spaced. One skilled in the art will recognize that the number of paddle portions 30 may be varied in accordance with factors such as the amount of cooling desired, the size of the heat exchange unit 41 and so forth. As is illustrated in FIG. 9, the paddle portions 30 may include ridges 32 which extend latitudinally along the paddle portions 30 to facilitate distribution of the refrigerant about the heat exchange unit wall 16.

The rotating paddle assembly 20 is adapted to be selectively rotated (on a mechanism so that the rotation is substantially continuous) about the primary axis. The rotating paddle assembly 20 is an essential element of the heat exchange unit 41 when the invention is employed in zero gravity conditions. The paddle drive rotates the paddle portions 30 at a sufficiently rapid rate that centrifugal force causes the refrigerant medium to move radially outwardly of the paddle portions to embrace the inner periphery of the vessel wall 16. It will be noted that the paddle portions 30 do not directly contact any portion of the heat exchange unit 41.

As is illustrated in FIG. 7, the vacuum cap 22 is provided with a series of radially spaced output apertures 34. The output apertures 34 are adapted to provide end points of an internal flow path within the heat exchange unit 41. In particular, via a conduit or other connection to one or more apertures 34, gas in the vessel 18 is ejected through the gas apertures 34 to the compressor 102 (FIG. 1).

A drive assembly 36 is utilized to rotate the rotating paddle assembly 20 about the primary axis. The drive assembly 36 is mounted in the cap 22 of the heat exchange unit 41 and includes a power supply interface 24 for connection to a direct current power source 14.

The operation of the gravity independent heat exchange unit 41 may be provided by a user triggering a switch (not shown) to provide power to the heat exchange unit 41 or by a control device (not shown). Generally, when the heat exchange unit 41 is being used to cool a product, such as ice cream, a user will insert the heat exchange unit 41 into the housing 108, which is connected via a conduit to the regenerator heat exchanger 110 or compressor 102 as described in detail above. The paddle assembly 20 then rotates at a generally constant speed, centrifugal force causing the refrigerant medium to move radially outwardly of the paddle portions 30 to embrace the inner periphery of the vessel wall 16, thereby facilitating heat exchange and also separating liquid from gas. The gas is drawn out through the outlet apertures 34. When the user is satisfied that his or her product is sufficiently cooled, the user can turn off the heat exchange unit 10. The gas in the heat exchange unit 41 is then expelled via the outlet apertures 34.

It will be appreciated by persons skilled in the art that the present invention is not limited to what has been shown and described hereinabove, nor the dimensions of sizes of the physical implementation described immediately above. The scope of invention is limited solely by the claims which follow.

I claim:

1. A freezing system for use with a radiating device, comprising:

a housing;

a heat exchange unit disposed within said housing which is adapted to provide optimal heat exchange to a medium to be cooled, comprising:

a vessel for holding a material for facilitating cooling:

a device for routing the material along a surface of said vessel, a valve coupled to said heat exchange unit and means for activating said valve to permit flow of said material;

a compressor for compressing said gas to an elevated temperature and pressure;

first conduit means for coupling said valve to said compressor;

means for applying said compressed gas to said radiating device for cooling said compressed gas;

an expander for expanding said cooled compressed gas at constant entropy;

second conduit means for coupling said radiating device to said expander; and third conduit means for coupling said expander to said housing for applying said expanded gas to said housing.

2. The heat exchange unit claimed in claim 1, wherein said device for routing the material along a surface of said vessel further comprises:

a liner member disposed adjacent said surface of said vessel.

3. The heat exchange unit claimed in claim 2, further comprising:

members disposed at each end of said heat exchange unit for preventing the material from leaving said vessel.

4. The heat exchange unit claimed in claim 3, wherein said members are cylindrically shaped.

5. The heat exchange unit claimed in claim 4, wherein said members engage upper and lower portions of said liner member.

6. The heat exchange unit claimed in claim 1, wherein said device for routing the material along a surface of said vessel further comprises:

a rotational assembly disposed within said vessel for circulating said material to the surface of said vessel for facilitating heat exchange.

7. The heat exchange unit claimed in claim 1, wherein said material is a refrigerant.

8. The heat exchange unit claimed in claim 7, wherein said material is a liquid refrigerant.

9. The heat exchange unit claimed in claim 7, wherein said refrigerant comprises:

Propylene glycol.

10. The heat exchange unit claimed in claim 9, wherein said propylene glycol is mixed at a ratio of approximately 10–20% by weight with water.

11. The heat exchange unit claimed in claim 7, wherein said refrigerant comprises:

a mixture of salt and a liquid.

12. The heat exchange unit claimed in claim 11, wherein said salt is mixed at a ratio of approximately 25% by weight with water.

* * * * *